US007020546B2

(12) United States Patent
Nagai et al.

(10) Patent No.: US 7,020,546 B2
(45) Date of Patent: Mar. 28, 2006

(54) VEHICLE DATA STREAM PAUSE ON DATA TRIGGER VALUE

(75) Inventors: Ikuya N. Nagai, San Jose, CA (US); William L. Welch, Mountain View, CA (US); James J. Cancilla, San Jose, CA (US); Dennis G. Williamson, Jr., Manteca, CA (US); David Steinberg, Cupertino, CA (US); Pieter Arnold Kop, Avenhorn (NL)

(73) Assignee: Snap-On Incorporated, Pleasant Prairie, WI (US)

( * ) Notice: Subject to any disclaimer, the term of this patent is extended or adjusted under 35 U.S.C. 154(b) by 147 days.

(21) Appl. No.: 10/700,046

(22) Filed: Nov. 4, 2003

(65) Prior Publication Data

US 2004/0172177 A1 Sep. 2, 2004

Related U.S. Application Data

(60) Provisional application No. 60/424,319, filed on Nov. 7, 2002.

(51) Int. Cl.
*G01M 17/00* (2006.01)
*G06F 7/00* (2006.01)
*G06F 11/00* (2006.01)

(52) U.S. Cl. ........................... 701/29; 701/34; 714/100

(58) Field of Classification Search .................. 701/29, 701/35, 34; 714/2, 100
See application file for complete search history.

(56) References Cited

U.S. PATENT DOCUMENTS 5,186,080 A * 2/1993 Simon et al. ............... 477/109

(Continued)

FOREIGN PATENT DOCUMENTS

EP 0997 838 5/2000

OTHER PUBLICATIONS

"Snap-on", Modular Diagnostic Information System- The new MODIS System fr.., http://buy.snapon.com/products/diagnostics/modis-system.asp. and linked downloadable documents Aug. 8, 2002. Total pp.: 10.

*Primary Examiner*—Yonel Beaulieu
(74) *Attorney, Agent, or Firm*—McDermott Will & Emery LLP

(57) ABSTRACT

Measurement data storage is triggered in response to occurrence of a user set condition with respect to one or more user-selected measured parameters, to thereby capture real-time monitored test data. In an application for a vehicle diagnostic tool, such as an engine analyzer, the measurements and attendant display may be provided during engine operation or actual vehicle operation. The tool software allows a user to specify any one or more of the measured parameters; and for any selected parameter, the user can identify an event with regard to the selected parameter. During the test, the processor executing the software captures measured parameter data, and the processor analyses the appropriate measured parameter data with respect to any and/or all user specified conditions. Triggering may be based on occurrence of an event or combinations of events. When triggered, the software will cause the tool to store some amount of captured data and/or pause the display to allow the user to analyze all available data.

27 Claims, 11 Drawing Sheets

U.S. PATENT DOCUMENTS

| | | | |
|---|---|---|---|
| 5,532,927 | A | 7/1996 | Pink et al. |
| 5,771,240 | A | 6/1998 | Tobin et al. |
| 6,227,043 | B1 | 5/2001 | Schoenbeck et al. |
| 6,285,932 | B1 | 9/2001 | De Bellefeuille et al. |
| 6,405,111 | B1 | 6/2002 | Rogers et al. |
| 6,529,620 | B1 * | 3/2003 | Thompson .................. 382/141 |

* cited by examiner

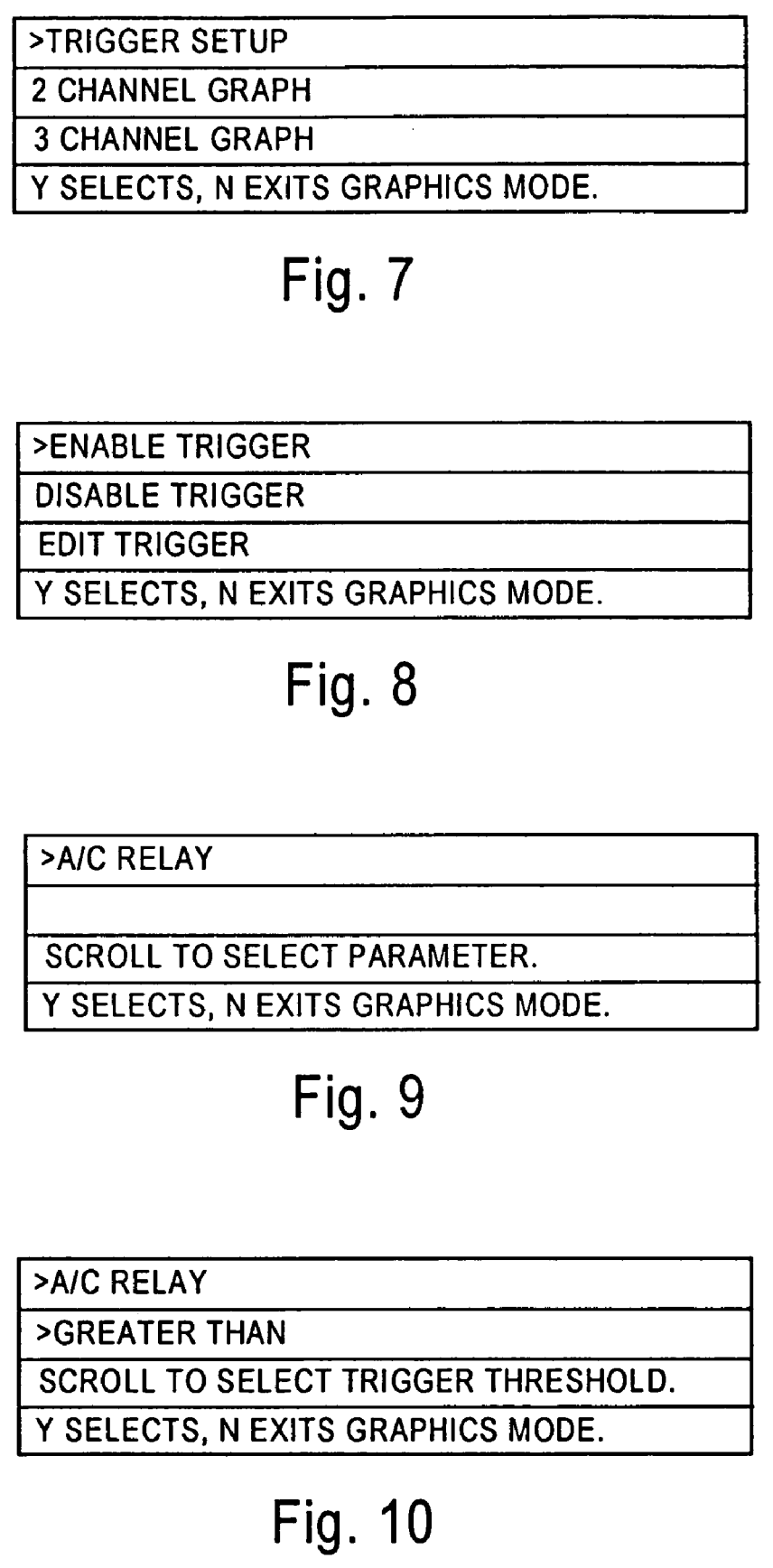

| |
|---|
| >TRIGGER SETUP |
| 2 CHANNEL GRAPH |
| 3 CHANNEL GRAPH |
| Y SELECTS, N EXITS GRAPHICS MODE. |

Fig. 7

| |
|---|
| >ENABLE TRIGGER |
| DISABLE TRIGGER |
| EDIT TRIGGER |
| Y SELECTS, N EXITS GRAPHICS MODE. |

Fig. 8

| |
|---|
| >A/C RELAY |
| |
| SCROLL TO SELECT PARAMETER. |
| Y SELECTS, N EXITS GRAPHICS MODE. |

Fig. 9

| |
|---|
| >A/C RELAY |
| >GREATER THAN |
| SCROLL TO SELECT TRIGGER THRESHOLD. |
| Y SELECTS, N EXITS GRAPHICS MODE. |

Fig. 10

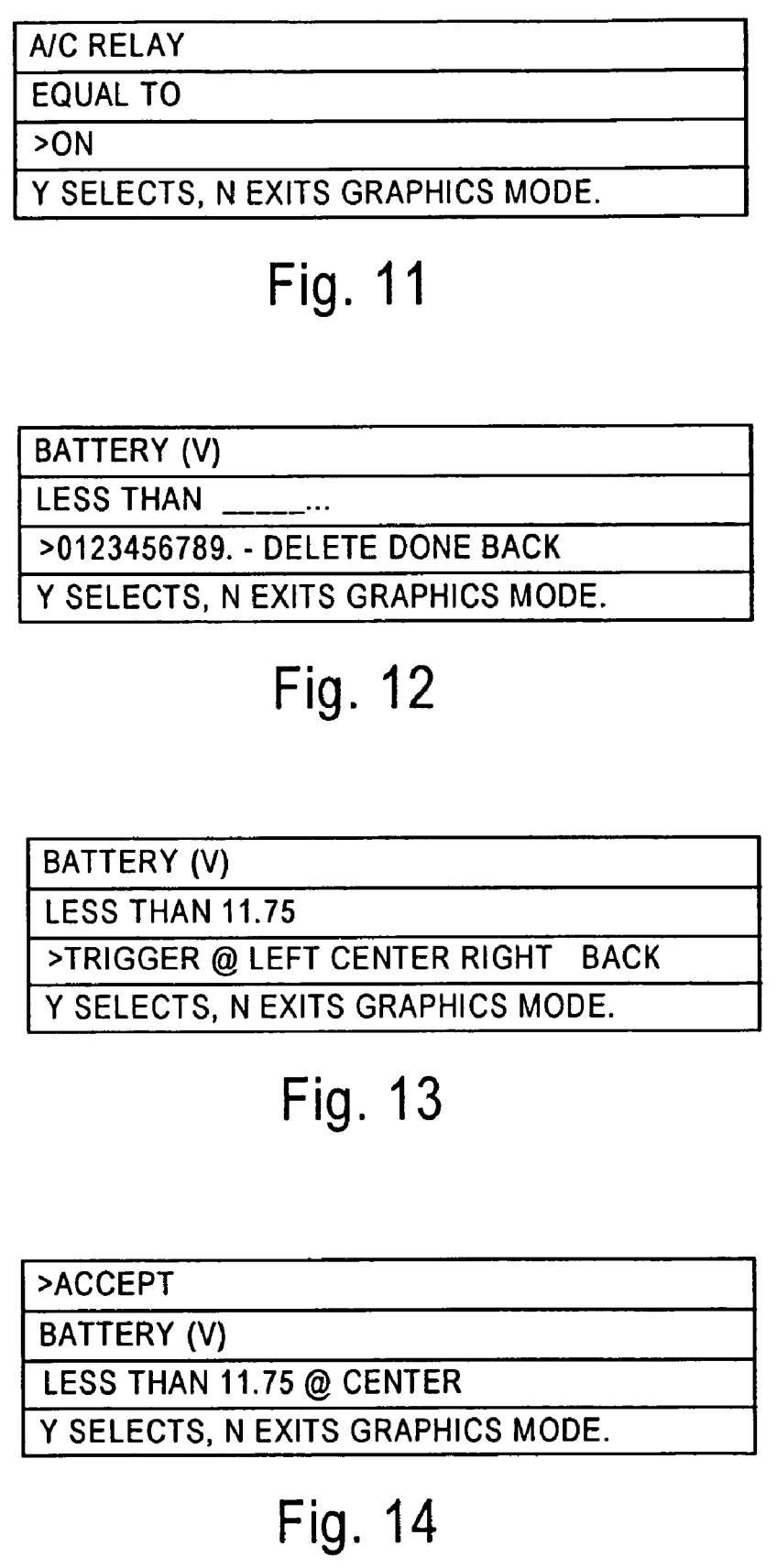

| |
|---|
| A/C RELAY |
| EQUAL TO |
| >ON |
| Y SELECTS, N EXITS GRAPHICS MODE. |

Fig. 11

| |
|---|
| BATTERY (V) |
| LESS THAN _____... |
| >0123456789. - DELETE DONE BACK |
| Y SELECTS, N EXITS GRAPHICS MODE. |

Fig. 12

| |
|---|
| BATTERY (V) |
| LESS THAN 11.75 |
| >TRIGGER @ LEFT CENTER RIGHT BACK |
| Y SELECTS, N EXITS GRAPHICS MODE. |

Fig. 13

| |
|---|
| >ACCEPT |
| BATTERY (V) |
| LESS THAN 11.75 @ CENTER |
| Y SELECTS, N EXITS GRAPHICS MODE. |

Fig. 14

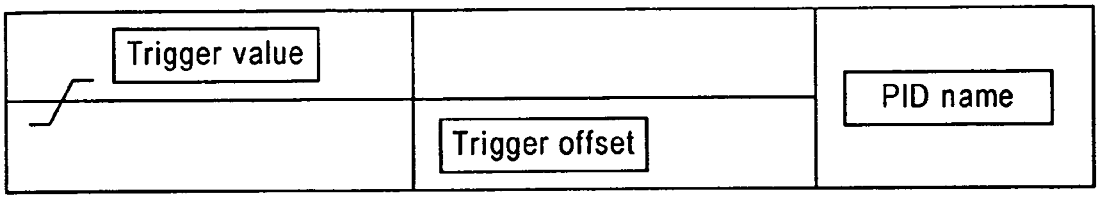
Fig. 19
Setting the trigger
Fig. 20
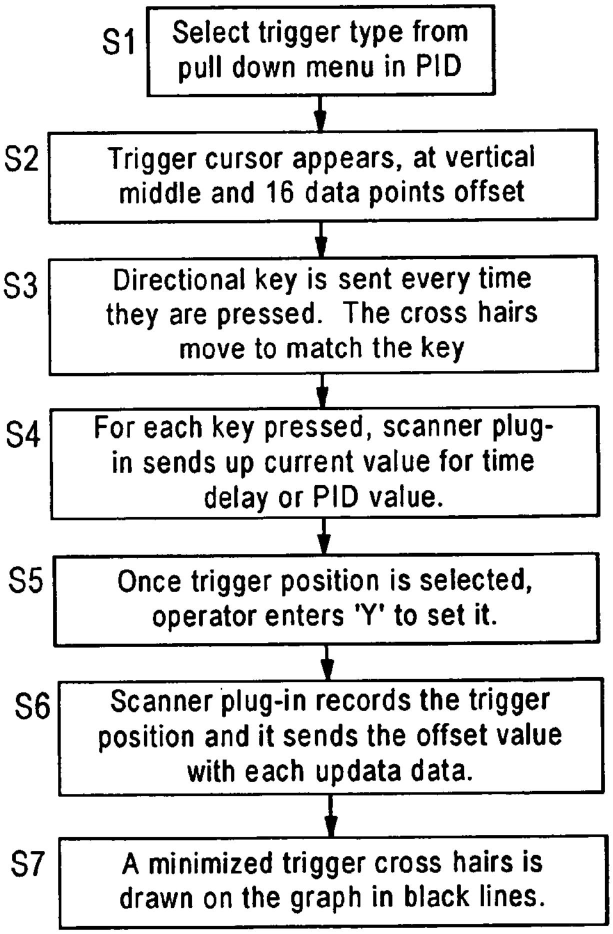

Fig. 22 Trigger capture cancel
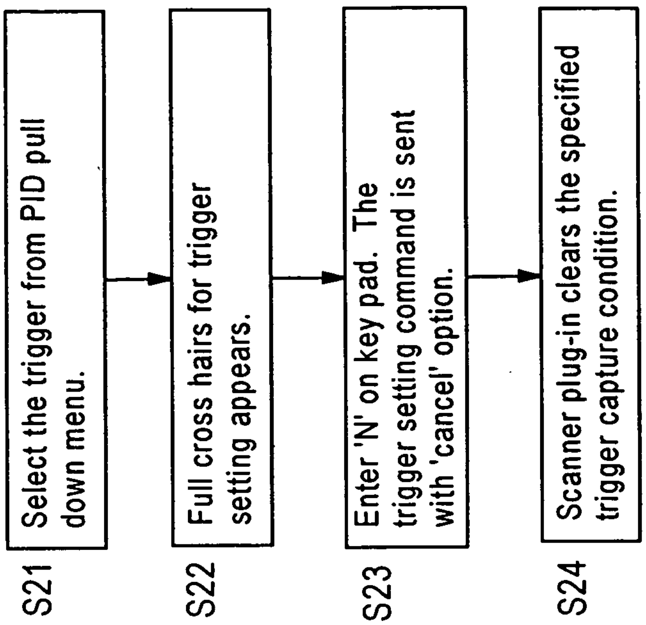
Fig. 21 Trigger capture
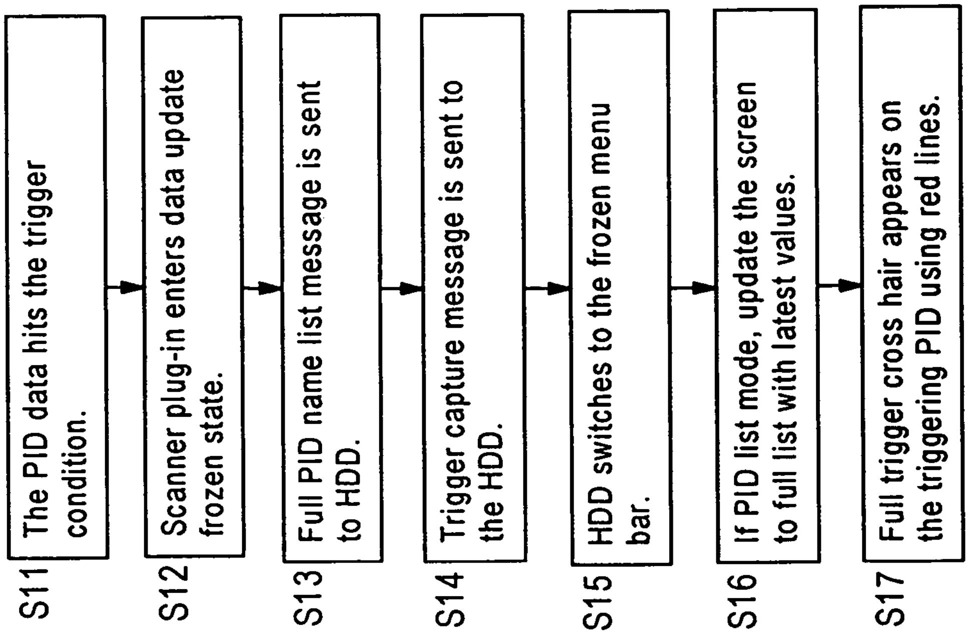

VEHICLE DATA STREAM PAUSE ON DATA TRIGGER VALUE

RELATED APPLICATIONS

This application claims the benefit of U.S. Provisional Application No. 60/424,319 Filed Nov. 7, 2002 entitled "VEHICLE DATA STREAM PAUSE BASED ON DATA VALUE," the disclosure of which also is entirely incorporated herein by reference.

TECHNICAL FIELD

The present subject matter relates to techniques for triggering a diagnostic device to store data from one or more running measurements of diagnostic parameters for later review, where the storage is activated in response to a user defined trigger event, such as a user selected one of the parameters exhibiting a user specified characteristic.

BACKGROUND

Many diagnostic tools, such as used to analyze operation of motor vehicles or the like, provide continuous read-out of one or more measured parameters, now typically shown as text or graphical displays. Examples of computerized diagnostic systems for automotive applications are disclosed in U.S. Pat. No. 6,285,932 to de Bellefeuille et al. and U.S. Pat. No. 6,405,111 to Rogers et al.

As the sophistication of such tools has increased, the diagnostic tools have provided more and more data output to the user. Where the apparatus or system under test is running during the test, the tool often provides a concurrent real-time display for the user to view. The diagnostic tool may perform measurements (e.g. in a manner similar to a volt-ohm meter) and/or receive measurement information from remote sensor devices, for example by scanning on-board sensors incorporated into a vehicle by its manufacturer and/or through data acquisition from a vehicle's on-board diagnostic system via a specific diagnostic connector designed for that purpose by the manufacturer. The display shows changing information from the running measurements by the diagnostic tool and/or from the on-board sensors. Where the advanced tool processes many parameters concurrently, the diagnostic tool provides ongoing real-time output of the measured values of numerous parameters. For example, a display screen of an engine analyzer might provide concurrent running text and/or graphical display of six or eight engine parameters or more. In a graphic output example, the tool might concurrently show six or eight waveform plots on a display screen, like parallel plots on a scope.

In operation, a user has been required to remain near the display and monitor the displayed output(s) during the test. For an engine analyzer application, it has been proposed that the system have an associated portable display and control unit, to allow the technician to move about the vehicle during the test yet still observe the displayed parameters on the portable device (see e.g. U.S. Pat. No. 6,227,043 to Schoenbeck et al.). Although this may provide the user some degree of freedom, the user must still observe the display during the ongoing test, which may not always be convenient.

Some users of diagnostic tools can not safely observe the display during a test. For example, if the tool is incorporated into or connected to a vehicle and operated while a person is driving the vehicle, for test purposes, the driver must concentrate on driving the vehicle and can not pay close attention to the display throughout the test drive. Clearly a need exists for a technique to operate a diagnostic tool that provides real-time display(s) but does not require constant monitoring.

As an initial answer to this need, Snap-on has offered one or more diagnostic tools with a number of "trigger" modes in which the tool will capture and store data for the measured parameters for later display, in response to occurrence of certain pre-defined trigger events. The data stored for later review may correspond to the moment in time when the tool detects the trigger. Some of the Snap-on tools take a snap shot of the measured data parameters, in response to activation of the "trigger" function. The "snap shot" actually involved capture and buffering of running parameter data for some period of time, such that the storage of buffered data upon triggering maintains data from the time of the event as well as data from before and/or after the trigger occurs. An option on the trigger menu allowed the user to define the position of the snap shot frames recorded relative to the trigger, i.e. to trigger storage for later review at the beginning, the middle or the end of the buffer range. Once a snap shot has been recorded, it can be reviewed frame by frame, and up to 6 parameters plotted on the display screen in a graphing mode.

In one of the Snap-on products, the available trigger functions include, a Quick trigger, a Manual trigger and an Any Code type trigger. The quick trigger/manual trigger types are accessed from different menus but are otherwise similar. When activated, the Quick trigger immediately starts capturing data for later display; whereas in the Manual trigger type operation, the tool waits for a keypress after which it begins capturing data. In both of these modes, however, the operator manually causes the tool to store captured data for later display.

The Any Code type trigger relates to receipt of special diagnostic codes from the on-board diagnostic system of the vehicle under test. The user, however, has no option to select or control the particular code to look for. Receipt of any of the codes from the vehicle automatically triggers the snap shot recording of data, essentially so the tool records data upon detection of occurrence of any trouble code at all. Another predefined trigger related to engine RPM falling to 300 RPM or less.

In each type trigger operation, the tool stores parameter data, for later review by the user. As a result, the user need not remain present throughout the test. With the Quick trigger or Manual trigger operation, the user can activate the diagnostic tool and leave it to collect the data. With the code-based trigger or the RPM trigger, the user can leave the test vehicle running and the tool operating and look back later (e.g. after a test drive is complete) to observe the data stored upon detection of the trouble code or the low RPM.

However, these options alone are not sufficient for many diagnostic applications. If the event that the user needs to observe does not rise to the level of a "trouble" or result in the low RPM, then the user must observe the test results until he/she sees the desired event or some combination of measured conditions and can manually trigger the data storage. Hence a need still exists for a more convenient technique for controlling or operating a diagnostic tool that provides increased flexibility in providing the user with necessary data while minimizing the amount of direct observance necessary during the test.

SUMMARY

The present concepts address the above noted problems with operation of diagnostic devices by providing a triggered data storage operation that is responsive to a user set condition with respect to one or more user-selected measured parameters to capture real-time monitored test data.

In an example, the diagnostic tool develops or receives measured data for display, with regard to one or more test parameters. In an application for a vehicle diagnostic tool, such as an engine analyzer, the measurements and attendant display may be provided during engine operation or actual vehicle operation. The tool software allows a user to specify any one or more of the measured parameters; and for any selected parameter, the user can set a trigger event with regard to the selected parameter. During the test, the processor executing the software captures measured parameter data, and the processor compares the appropriate measured parameter data to the user specified trigger(s). When a measured diagnostic parameter meets the criterion of the trigger(s), or the tool receives the user selected code, the software will cause the tool to store some amount of captured data and/or pause the display to allow the user to analyze all available data.

The type of condition defined for the trigger event may encompass a variety of conditions and/or combinations. The trigger, for example, may be a threshold level for the selected parameter. If the parameter rises to or passes the threshold, the tool initiates data capture. Of course, the trigger may be set to activate data capture when the parameter falls to or below the threshold. If the tool receives trouble codes, the user may have an option to select one of the trouble codes from among those that may be received, e.g. from a vehicle with on-board sensors.

The trigger events disclosed herein, however, include other examples. In one such further example, the tool may be set to trigger data capture based on a rising or falling edge of a monitored parameter signal, e.g. upon crossing a threshold in a specific up or down (rising or falling) direction. Triggering may also utilize detection of combinations of events, for example using Boolean logic. The combinations may occur simultaneously or within some set time period. If occurring over time, the logic may require the events in the different parameters to occur in a particular order.

Of course, rather than defining an event or events in any such manner using an actual signal level, it is also conceived that the trigger analysis may use an integral or differential value of one or more of the measured parameters. Yet further examples of triggers include detection of a set number or count of occurrences of a selected event, e.g. passing a threshold several times during the test or during a set interval.

The data storage typically includes data for all parameters under test at the time of the trigger event. The data storage may relate only to a moment in time (e.g. like a still frame image or photograph of the displayed data). In a disclosed examples, however, the diagnostic tool continuously buffers data for each measured parameter, for an interval of time. When triggered in response to one or more parameters hitting the specified condition(s), the software allows the tool to continue the test for some user selectable time delay, for example, to allow the tool to store data at and for some period after the trigger event. Depending on the selected timing of the trigger relative to the data capture interval, the stored data may include some data buffered prior to the triggering event, data at the time of the event and/or data from some time after the event. The user can then review the data, for all measured parameters, over the length of the specified interval. For example, the user may be able to replay buffered data frame by frame or much like a "movie" to view the data output for numerous parameters from before during and after the event in which one or more of the parameters met its associated trigger condition. The output may provide textual display, graphics or a combination of text and graphics, for each of the monitored parameters.

As a result, the user can set up a test but need not observe the test results during operation. For example, the user can actually drive a vehicle under test, and later review a "movie" of the measurement data captured around the time of a trigger event, after the vehicle stops or returns to the shop. During the review, however, the user can observe any or all of the measured operating parameters and may be able to replay them, if desired.

Additional objects, advantages and novel features of the examples will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7 is a representative illustration of trigger setup via a graphics mode options display screen.

FIG. 8 illustrates a trigger options screen, for enabling, disabling or editing a trigger.

FIG. 9 illustrates the data displayed on a trigger sensor selection screen.

FIG. 10 depicts the data displayed on a trigger threshold select screen.

FIG. 11 depicts the data displayed on a finite valued select screen example.

FIG. 12 shows the data displayed on a numerical value select screen example.

FIG. 13 represents an exemplary trigger position select screen.

FIG. 14 represents an exemplary trigger verification screen.

FIG. 19 represents an exemplary display for entering trigger value, in the example of FIGS. 15-18.

FIG. 20 is a flow chart of the processing steps involved in setting a trigger.

FIG. 21 is a flow chart of the processing steps involved in trigger capture.

FIG. 22 is a flow chart of the processing steps involved in canceling trigger capture.

DETAILED DESCRIPTION OF THE EXAMPLES

The various examples disclosed herein relate to techniques for triggering data storage in a diagnostic tool. In many implementations, the triggering and data storage functions are controlled by programming or other control logic of the diagnostic tool. To insure a full understanding, it may be helpful to consider a first example of a tool that may be programmed to capture measurement data and trigger and store data, as desired.

Figure 1:
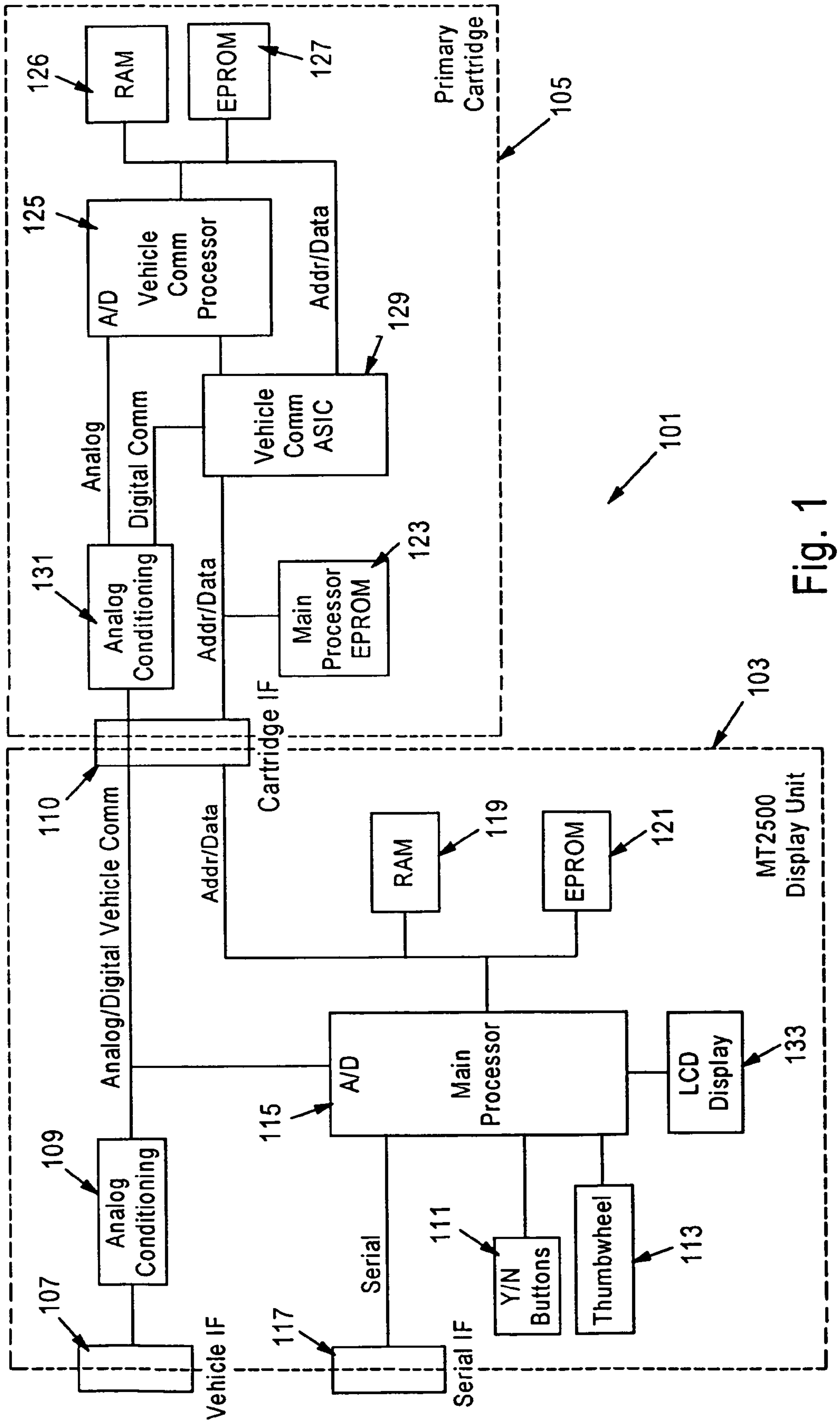
FIG. 1 is a functional block diagram of an MT2500 Series Scanner, which is one example of a diagnostic tool that can be programmed to implement the triggering and data storage functions.

FIG. 1 is a functional block diagram of an MT2500 Series Scanner, which is an advanced vehicle diagnostic tool available from Snap-on. The MT2500 connects to a scanner interface of the vehicle and displays live data and complete data and trouble code descriptions, for a wide range of late model motor vehicles. The MT2500 provides the capability to interrogate the major computer systems on a vehicle through a standard OBD II vehicle communication interface, a Manufacturer specific vehicle communication interface or other communication interface. The system 101 consists of a handheld display device 103 and up to two removable "cartridges," which plug into the handheld unit. The cartridges (of which one is shown) consist of a primary cartridge 105 that is responsible for vehicle communication and a "Troubleshooter" cartridge (not shown) that contains extra memory for storage of tips and data to help the mechanic diagnose problems with the vehicle.

As shown in FIG. 1, the handheld unit 103 consists of a vehicle interface 107 with appropriate analog conditioning circuitry 109, and a cartridge interface 110. A set of Yes/No buttons 111 and an analog thumbwheel 113 allow the operator to interact with the main processor 115 during selection of vehicle type and other parameters. A serial port 117 enables communication with external devices (such as a PC), an LCD 40×4 display 133. The operation logic of the tool is implemented by an 8 bit main processor 115 with RAM 119 and EPROM memory 121. The EPROM memory 121 resident on the main board provides a boot up capability only. The primary executable code for the main processor 115 actually resides in memory 123 on the primary cartridge 105. This allows for updating of the main processor software by changing the cartridge 105 without requiring changes to the main board, and the software typically is updated annually.

The main responsibility of the primary cartridge 105 is to provide low level communication with the vehicle at the request of the main processor 115. The primary cartridge 105 has a dedicated processor 125 for this vehicle communication that uses RAM 126 as memory and executes programming from EPROM 127 locally on the cartridge 105. Updates to the software for the vehicle communication processor are handled in a similar fashion as for the main processor, except that vehicle communication updates are much more infrequent. The primary cartridge 105 also contains a communications ASIC 129 that directly interfaces with the vehicle under the control of the processor, along with an analog conditioning circuit 131 that provides the vehicle analog signals to the processor's on-board A/D converters, and simultaneously provides a digital representation of those lines to the ASIC 129.

Snap-on offers models of the MT2500 Series Scanner with textual display capabilities. Snap-on also offers an enhanced MTG2500 version of the tool shown in FIG. 1, referred to as a color graphics scanner. The color graphics scanner version provides all the capability of the MT2500 and accepts the same cartridges. The primary difference between the MT2500 and the MTG2500—color graphics scanner version is the addition of a color LCD screen 133 to the handheld display device and the ability to graph parameters on the color LCD 133 in addition to providing the standard textual displays on that same screen. On the color graphics scanner, a second processor (not separately shown) has been added to the Display unit main board. This second processor is responsible for controlling the color LCD 133 and for providing the graphing capabilities. The implementation is such that neither the Primary Cartridge nor the Main Board processor is aware of the presence of the graphing processor. Attempts by the Main Processor to send data to the 4×40 LCD display (which is no longer present) are intercepted by the graphing processor and routed to the new color LCD 133 either in text or graphical mode. The color graphics scanner version of the tool offers full color display of static or live data at the push of the graphing button, as well as freeze frame graphing for quick and easy review of information over time.

For purposes of the present discussion, the programming of the diagnostic tool enables the tool to offer a series of user selectable trigger operations and attendant data storage functions. Triggering of data storage, such as a data movie, is based on one or more PID (parameter identifier) values. Essentially, the device provides menu displays giving the user the option to set up a recording event that can be triggered by a user selectable value (e.g. threshold, edge, differential, integral, counted number of events, etc.) for any user selected PID or for any variety of combinations of multiple events and PID values. The parameter data corresponding to a selected PID may come from any module on the vehicle. Another option allows the user to set up triggering based on a user selectable "Code", instead of just "any code" that the vehicle may send to the scanner, and/or combinations of PID events and one or more codes.

In a simple one-parameter example, the monitored parameter data is supplied to the tool from the vehicle's on-board diagnostic system. Those skilled in the art will recognize that the tool itself may perform the measurements. For example, a tool may offer an option to establish triggering based on any signal available from a Labscope or multimeter, which may be built into or connected, to the tool. The tool stores data for later review with the selected signal or parameter hits a user specified level. A Single code type trigger option allows the user to enter one specific trouble code, and the tool will start data storage upon the occurrence of the code signifying the one trouble selected for monitoring.

The condition defined for the trigger event may encompass a variety of conditions. The trigger, for example, may be a user-specified threshold level for a selected one of the measured parameters. If the selected parameter rises to or passes the threshold, the tool 101 initiates data capture. Of course, the trigger may be set to activate data capture when the parameter falls to or below the threshold. If the tool receives trouble codes, the user may have an option to select one of the trouble codes from among those that may be received, e.g. from a vehicle with on-board sensors. Implementations of the diagnostic tool may also offer user programmable logic to perform Boolean algebraic operations on selected parameters, for example, for OR-ing or AND-ing simultaneous or sequential triggers together.

The trigger events disclosed herein include other examples. For example, the combinations of events forming a trigger may occur simultaneously. Alternatively, events may occur within some set time period to trigger data capture. If over time, the logic may require that the events in the different parameters occur in a particular order.

Of course, rather than defining one or more events in any such manner using an actual signal level, it is also conceived that the trigger analysis may use integral or differential value of one or more of the measured parameters. Yet further examples of triggers include counting up to a set number of occurrences of a condition or event, e.g. passing a threshold several times during the test or during a set interval.

The diagnostic tool will also give the user various options of how much data is saved in relation to a trigger event. The tool may take an instantaneous image (like a "photograph") of the measured data parameters, for example by storing the current values of all measured parameters in response to activation of the "trigger" function. Alternatively, the tool may capture and buffer running parameter data for some period of time, allowing the device to respond to the trigger by storing data at the time of the trigger as well as buffered from after and/or before the designated trigger actually occurs. The tool programming allows the user to select the precise time range for buffering/storing and thus the time period for any display provided later as a movie or slideshow.

In an example, one option on the trigger menu defines the position of the snap shot frames recorded relative to the trigger, i.e. trigger at beginning, middle or end of the buffer range around the event. Once a snap shot has been recorded, it can be reviewed frame by frame, and in the example, up to 6 parameters can be displayed in a text mode or plotted on the display screen in a graphing mode. Hence, the tool captures parameter data, for later review by the user. As a result, the user need not remain present throughout the test. The user can leave the test going and the tool running and look back later (e.g. after a test drive is complete) to observe the data captured upon detection of the particular selected event.

An example of a method of using the tool with simple data value triggering involves the following steps:

step 1) Initiate vehicle communication and begin capturing the vehicle PID data streams of interest;

step 2) Technician selects select one of the PIDs available and sets a trigger condition (the trigger is based on the PID data such as specific value, transition at specific value, range of values, differential, integral, count, etc.);

step 3) Optionally, the technician sets the trigger capture range, which usually is expressed as quantity of data captured before and/or after the trigger;

step 4) The technician can optionally set multiple separate triggers as "concurrent", "consecutive" and "timing" combination usually in boolean expressions;

step 5) Restart PID data stream capture (running measurements/monitoring of parameters during engine operation or driving of vehicle);

step 6) During the running test operation, the trigger detection algorithm compares every new PID data received (or measured) against the trigger settings and stops when any condition is satisfied; and step 7) Buffered data captured during the running test operation at or around the time of the trigger event is kept in storage for later review by the technician on the display.

In the example, the user-definable trigger event settings consist of a trigger parameter I.D. (PID), trigger threshold, trigger value, and trigger display position (relative to the buffer range). The triggering capabilities of the product will allow the user to set up a trigger event, which will cause the product to monitor for the occurrence of this event. When the product encounters this event the display will visibly change indicating to the user that the trigger event has occurred.

Depending on the user-defined trigger display position the product may continue to capture and display data until the trigger display position is reached. Once the trigger display position has been reached data capture and display updates cease allowing the user to investigate the behavior of other PIDs of interest around the triggered event.

The device may be left alone to capture the 'glitch' automatically. This approach can capture complex glitches that were impossible to catch manually. The trigger combination also can be used to capture specific sequence behaviors.

In the MTG2500 type scanner tools and other examples, the technician can later display the captured data in various modes, for example as textual data, as graphical data or a combination thereof. Since the device has captured data for one or more parameters around the time of the event, the device can present the captured data to the user in such a manner as to allow a review thereof over a period of time, much like watching the display (in text, graphics, or a combination thereof) around the time of the event. Different examples may offer frame by frame replay or may offer a mode that appears as a 'movie-like' running display. Also, the device may enable the user to repeat the replay process any number of times, to allow the user to repeatedly review the data as part of an analysis of a complex pattern of data relating to a particular problem.

Figure 2:
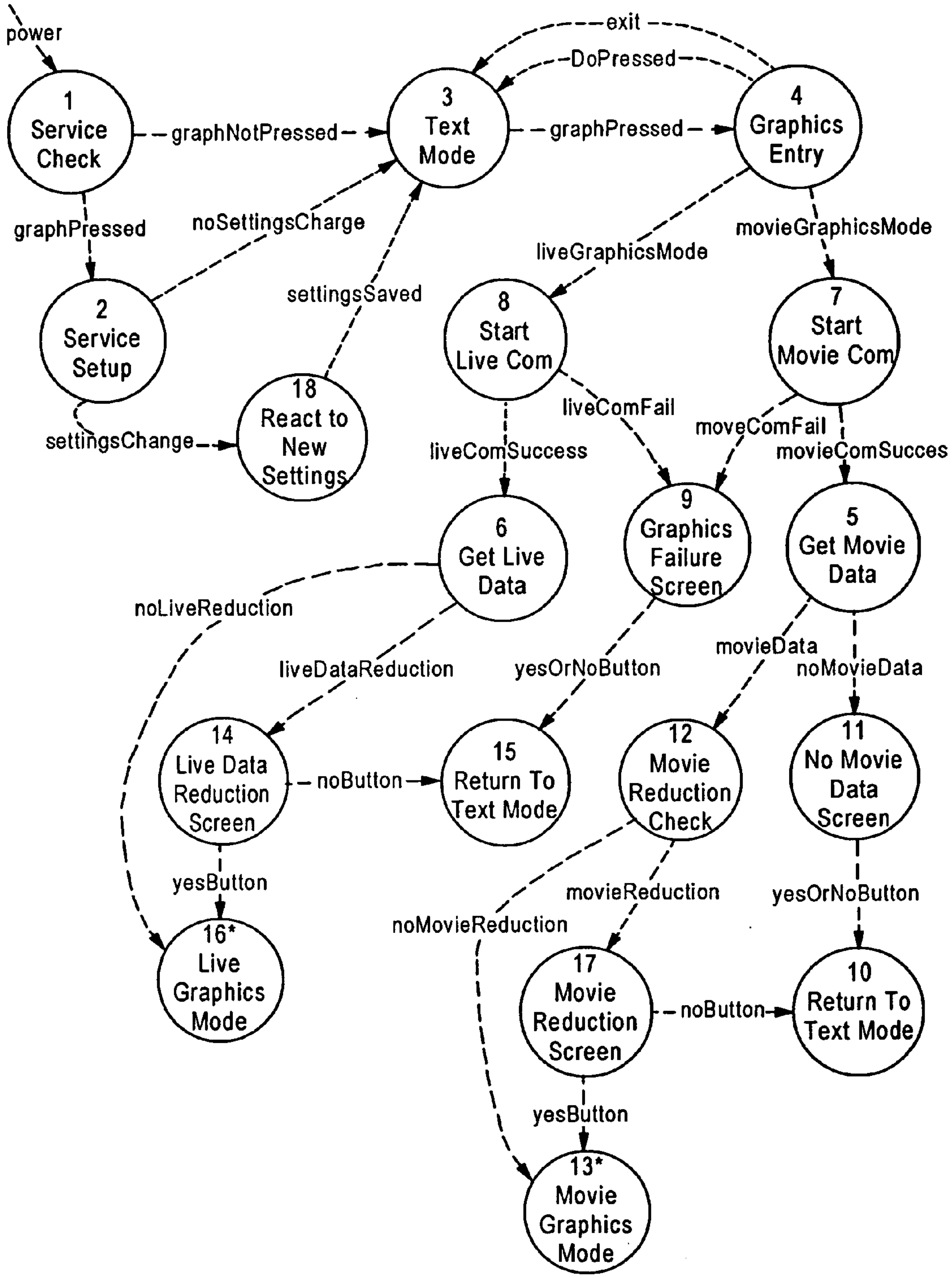
FIG. 2 is a state diagram illustrating the states involved in graphics entry, in the processing by version of the tool illustrated in FIG. 1.
Figure 3:
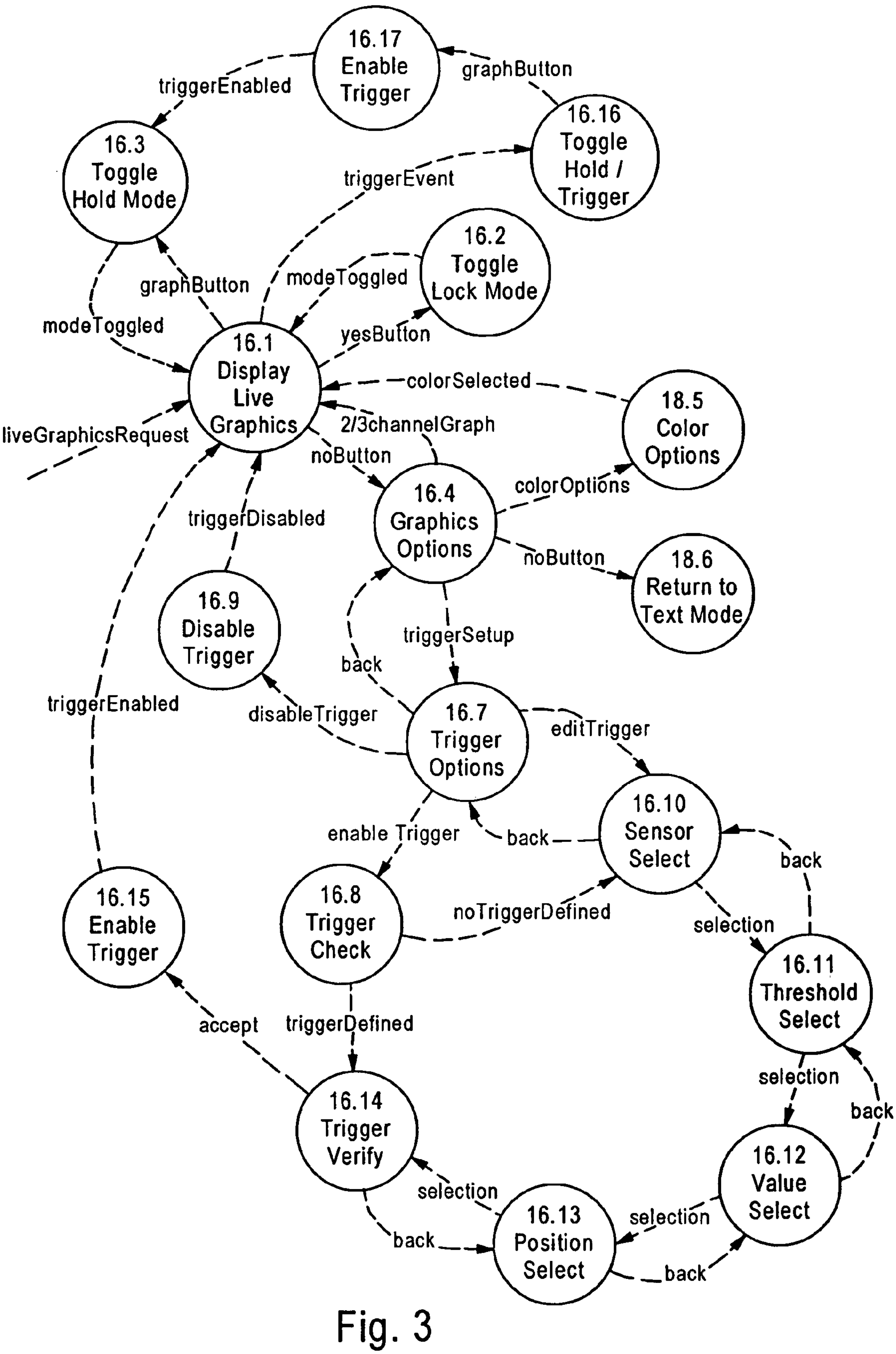
FIG. 3 is a state diagram illustrating the states involved live graphics display, in the processing by version of the tool illustrated in FIG. 1.

FIG. 2 is a state diagram illustrating the states involved in graphics entry, in the processing by the MTG2500 version of the tool. FIG. 3 is a state diagram illustrating the states involved live graphics display.

The MTG2500 version of the tool offers both text and graphics display modes. After start-up, the user may optionally set up a data list, using the text mode. Then, the graphics mode is entered via the selection from a first graphics mode entry screen. The user is returned to text-based mode if no button is pressed as a selection from the graphics mode entry screen, so as to allow the user to return to text-based mode, if graphics mode was inadvertently entered. Also, the first graphics mode entry screen is displayed in the currently selected language using an assembler call to a C function. There is a different protocol sequence needed for requesting movie data as opposed to sensor data. The first graphics mode entry screen therefore provides a mechanism to differentiate between the two types of data the user desires.

Selecting either GRAPHICS MODE item causes a graph mode to be entered and is indicated by a second graphics mode entry screen. This screen and all subsequent screens are displayed in the currently selected language via a multi-language table-driven menuing system. If there are problems capturing data, feedback text screens will appear in the currently selected language until data capture begins or is terminated.

When successful data capture begins the software will dynamically scale the sensor history list lengths based on the user's currently selected data list. If there is not enough memory to store a complete history of the current data list the data reduction feedback screen will appear before the graphic information is presented.

When the user presses the yes (Y) button in response to the confirmation screen, a two channel graph plot is presented by default. Pressing the no (N) button results in the return to text-based mode, where the user can revise the data list if desired. If the sensor data history is not reduced, the confirmation screen is skipped and the default two channel graph plot appears for the selected graphics mode. If the user selects movie graphics mode and there is no movie data available the no-movie data feedback screen will appear. Pressing the yes or no button returns the user to text mode to recapture the movie data if desired.

Figure 4:
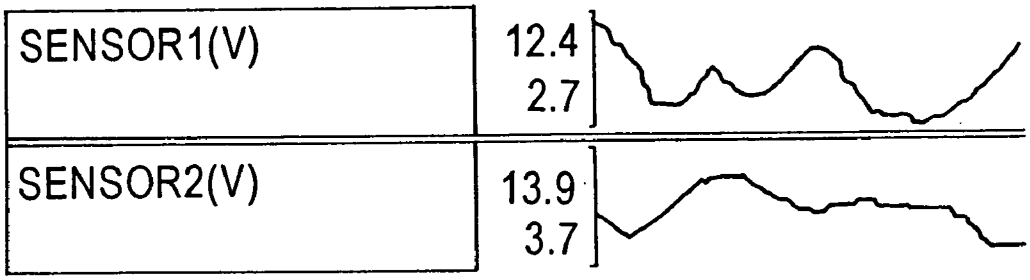
FIG. 4 is a representative example of the display of a live two channel graph.

In the live graphics mode, a default two channel graph appears when the first data point is captured. FIG. 4 is a representative example of the display of a live two channel graph. In the current MTG2500 example, there is no horizontal scrolling in the live graphics mode, since presently the complete history of each channel is always visible. However, since the software presently has scalable histories based on the size of the data list chosen, scrolling could be added to live graphics mode.

Figure 5:
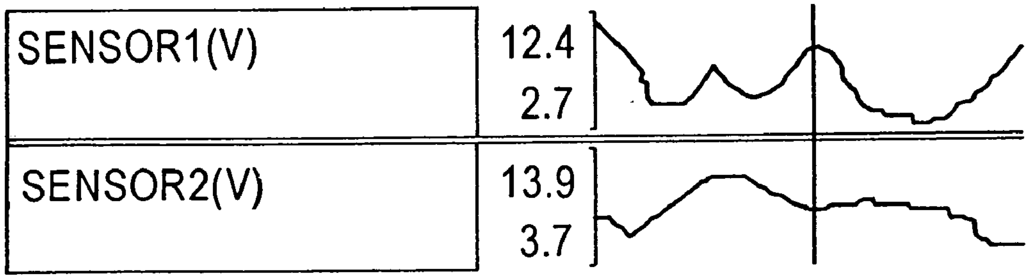
FIG. 5 is a representative example of the display of a live two channel graph in the movie mode.

In the movie graphics mode, a default two channel graph appears when the complete movies are captured. FIG. 5 is a representative example of the display of a live two channel graph in the movie mode. For purposes of illustration, the data shown in this graph is similar to that shown in FIG. 4, for example, as if the data of FIG. 4 were captured in response to a trigger and replayed. A vertical line cursor is shown at the center of the graph, and its associated data point value is displayed in the usual manner. The cursor moves across the display, to identify the current data point or time point in the movie replay. Of course those skilled in the art will recognize that other forms of data replay may be displayed to the user.

Navigation through the movie is accomplished by pressing the graph button. When pressed, a scroll icon will appear where the hold indicator usually appears for live graphics mode. When the scroll icon is displayed, the user may scroll the thumbwheel up or down, which will scroll the cursor left or right respectively. When the cursor reaches either extreme the data will scroll in the appropriate direction until no more data can be presented. The user exits scroll mode by pressing the graph, after which the scroll icon disappears and vertical scrolling through the data list channels returns.

The MTG2500 supports two channel and three channel graphical display outputs. Hence, an interface is provided to handle selecting two or three sensor plots, as well as color settings. This screen is accessed by pressing the no button, when graphics data is being presented. This selection screen offers a menu of options to choose 2 channel graph, 3 channel graph, color options, and trigger setup. If the user is in movie graphics mode, the trigger setup selection will not be presented. Operation of the yes button selects a highlighted menu item, whereas operation of the no button causes the device to exit the graphics mode. Selecting any of the graph options causes the appropriate graphical representation to appear on the display. If time permits, it is possible to save the graphics mode selection to a non-volatile storage device. This setting would then be used at startup for subsequent sessions.

Figure 6:
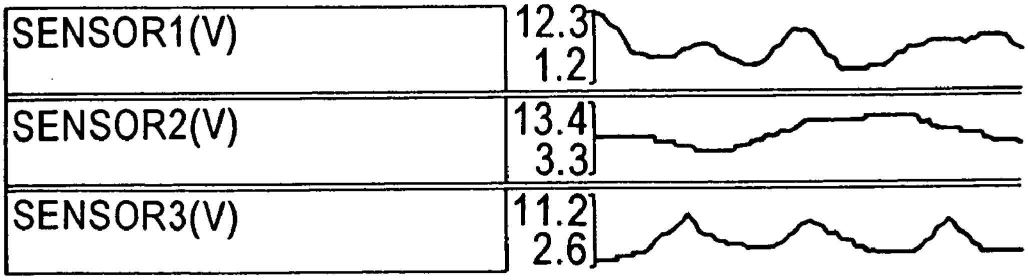
FIG. 6 is a representative example of the display of a live three channel graph.

The manually selected two channel graph mode operates in the manner discussed above for the default two-channel case, relative to FIGS. 4 and 5. When three channel graph mode is selected, the data is presented as represented by the example shown in FIG. 6. Although not shown, the device provides a movie mode with three channels, similar to the two channel operation discussed above relative to FIG. 5. Selecting COLOR OPTIONS from the graphics mode options screen presents the user with various choices to set the visual characteristics of the color display of the graphical data.

As noted, the graphics mode options screen also includes a menu listing item for trigger setup. Selection of this option starts a process to allow the user to set up a trigger event, in this example, on any single sensor. For discussion purposes, this option is available only in live graphics mode, although those skilled in the art will recognize that similar options could be provided for textual display operations.

The triggering capabilities of the exemplary MT2500 product allow the user to set up a trigger event which will cause the software to monitor for the occurrence of this event. When the software encounters this event, the display will visibly change indicating to the user that the event has occurred. Depending on the user-defined trigger position, the software may continue to capture and display data until the trigger position is reached. Once the trigger position has been reached, data capture and display updates cease allowing the user to investigate the behavior of other sensors of interest around the triggered event.

Trigger setup is entered by selecting the trigger setup item in the graphics mode options screen as shown in FIG. 7 When yes is pressed in the graphics mode options screen, the trigger options screen is presented, as shown for example in FIG. 8. The selections available in this screen are to enable trigger, disable trigger, edit trigger, and back so as to allow the user to back out of the trigger setup if it was inadvertently entered. However, the enable and disable trigger selections will not appear on the screen if a trigger has not yet been defined. Table 1 below lists the system responses to this screen.

TABLE 1

| State | Event | Response |
|---|---|---|
| Trigger exists | Enable trigger | Trigger verification screen |
| Trigger exists | Disable trigger | (re)enter graphics mode with trigger disabled |
| X | Edit trigger | Proceed to trigger sensor selection screen |
| X | Back | Return to graphics mode options screen |

The (re)entry to graphics mode responses occur to allow the user to quickly enable or disable the trigger and return to graphics mode.

When the edit trigger option is selected, from the trigger options screen, the trigger sensor selection screen appears, an example of which is shown in FIG. 9. The first line provides space for selection of an item from a list, and operation of the terminal enables the user to scroll the list of selections, in this case selectable items relating to all available sensors from the user's data list, bringing each item on the list to the first display line. The user selects a desired item by pressing the yes (Y) button when the desired item appears in the second line of the display shown in FIG. 9. In the example, the scrolling has brought the A/C Relay data item to that line, so that the user may now select that parameter for further processing to set an associated trigger. There is also an entry to allow the user to return to the previous screen if this screen was inadvertently entered. The device could also have the sensor list appear such that the first selectable sensor corresponds to the top channel which was being displayed in graphics mode when the user entered trigger setup. Of course those skilled in the art will recognize that other display and selection techniques may be used, for example, if the terminal has greater text or graphics display and input capabilities.

In the example, when a parameter is selected from the previous screen, the trigger threshold selection screen appears, for example, as shown in FIG. 10. The parameter selected from the previous screen now appears at the top of the display, and the selectable item from a list appears the second line of the display. Here, the list relates to the type of threshold that the user desires to set-up. The user can now scroll the list of selections, and select a desired item by pressing the yes button when that item appears in the second line of the display shown in FIG. 10. In the example, the scrolling has brought the greater-than option to that line, so that the user may now select that option. The selectable items available through this process and displayable via this screen may be greater than, less than, equal to, and not equal to, and BACK. Selecting BACK allows the user to return to the previous screen to revise the parameter selection. Of course, other options may be provided.

When a threshold is selected from the previous screen the trigger value selection screen appears. The value selection screen will vary based on the currently selected trigger sensor. For discussion purposes, assume first that the user selected a trigger sensor that is one which has a finite set of values (i.e. a binary sensor). The tool will display a trigger value selection screen, such as that shown in FIG. 11. In the example, the user has selected the A/C relay parameter and the equal to type threshold trigger, as shown on the first and second lines.

Selections are now made from the third line of the display and by scrolling up or down through the possible values. If the trigger sensor is a binary sensor, its two binary states would be presented. As shown in the example, the screen displays the ON value for the A/C relay parameter. If the sensor has seven finite values then the user would select from the list of textvalue1, textvalue2, . . . , textvalue7, and BACK. Note that only the values which have been already received by the software will be presented as there is no mechanism for predicting future unencountered values yet to be received for the sensor. Here, selecting BACK allows the user to return to the previous screen to revise the trigger threshold setting.

Next, assume for discussion purposes that the threshold selected from the threshold selection screen (FIG. 10) is a numerical value type trigger, such as the battery voltage (V) parameter. When the trigger value selection screen appears, it now provides a format to facilitate input of a numeric value, for example, as shown in FIG. 12. In this battery voltage example, the user has selected a less than type detection, and the need is to input a numeric value from the threshold.

In the example of FIG. 12, the display provides a horizontal presentation of available options on the third line, and the user selects from the displayed options by rolling the thumbwheel. As the thumbwheel is rolled, the active selection is changed and shown in reverse video (highlighted). The user presses the yes button to select a highlighted numeric value. In the example, the selections will be shown only if they are operational. For example, when the value field is empty, the DEL selection will not be shown. If the value field is negative, the minus sign selection will change to a plus sign selection and vice-versa. If the selected sensor is associated with integer values the decimal point selection will not appear, whereas if the sensor is associated with unsigned integer values the sign selection will not be shown, etc.

The trigger sensor may be associated with a data type designated as type “M,” to indicate hexadecimal format data. If the selected trigger sensor is associated with this type of data, the numerical trigger value select screen will include the selections A, B, C, D, E, and F, for hexadecimal selection. In this example, the decimal point will be fixed in the entered value field, and the decimal point and sign are missing from the available selections.

In either case (decimal or hexadecimal), for appropriate parameters, the routine allows the user to “build” the numerical value by successive scrolls and selects. As the numerical value is built-up, it will be displayed to the right of the trigger threshold on the second line of the display. The maximum length of the value field is shown with a corresponding number of underline characters. If the entered value does not correspond to the trigger sensors data type the software will automatically perform a conversion to the proper data type for the chosen trigger sensor.

Obviously, there are a number of ways to handle presenting acceptable trigger values within its current range for user input, and those skilled in the art will be aware of alternatives and how they might be implemented in the diagnostic tool.

The tool will also offer options to set the ‘position’ of the trigger relative to the buffered data captured for the movie type replay. Hence, after the user selects the parameter (FIG. 9) and the threshold type (FIG. 10) and inputs the threshold value (e.g. FIG. 11 or FIG. 12), then the trigger screen (FIG. 13) appears on the display. In this example, the user has selected battery voltage as the parameter (top line), a less-than type trigger and an 11.75 numerical value for the voltage threshold (second line). Again, the example provides a horizontal presentation of available options, which are accessed by rolling the thumbwheel. Here, the options include left, center, right and back. As the thumbwheel is rolled the active selection is changed and shown in reverse video.

Selecting trigger @ left, right, or center will cause data capture and updates to stop when the trigger point reaches the left, right, or center of the display respectively, for a leading, trailing, and center triggered data capture functionality. When the user selects the desired trigger position, the verification screen appears as shown by way of example in FIG. 14. From this screen, the user has the selection choices of ACCEPT, or BACK. Selecting ACCEPT returns the user to the graphics mode options screen, where graphics mode can be reentered with the trigger is enabled. Capture of data will then occur if/when the tool detects the defined trigger extent. However, when viewing the verification screen (FIG. 14), if the user is not satisfied with the entered trigger information, selection of the BACK option allows the user to navigate back through previous trigger related screens and reenter trigger related settings.

After the user sets up and enables the trigger in the graphics mode, the system watches for the trigger event while data is being captured. This mode is indicated by a trigger icon (the letter T inside a box) which appears on the screen where the hold icon usually appears. When the trigger event occurs, the system displays the trigger icon alternately with the hold icon to indicate to the user that the trigger event has occurred. Data capture and display updates may still occur due to the trigger position setting.

Once the trigger position setting is satisfied data capture and display updates are disabled (identical to hold mode operation). This allows the user to browse other sensors' data histories around the triggered event. When the user presses the graph button (hold button), this indicates to the system to re-enable the trigger and resume data capture and display updates. The trigger is disabled by selecting it from the trigger options screen via the graphics mode options screen.

As shown by the discussion of the example of FIG. 1, since the PID data streams are continuously captured, it is possible to set up a trigger mechanism that stops or "freezes" the data capture at any PID data derived triggering condition.

In the examples, the basic or simplest condition that may trigger data capture is a level trigger. In this case, there is a threshold set with respect to a user selected parameter. The threshold may be predefined, but in the example, the user has an option to set the threshold. The threshold may be selected from among stored values or manually input. The tool captures real-time measurement data from a respective monitored parameter, when the selected one of the parameters hits the threshold. If the threshold is an upper threshold, the tool captures data when the selected parameter rises to or passes up through the threshold. If the threshold is a lower threshold, the tool captures data when the selected parameter falls or passes below the threshold.

A related approach is to set a range (upper and lower thresholds) for the one selected parameter and trigger on passage through either threshold. Data could be captured when the parameter enters the range. However, in most cases, the range defines normal operation, and the data capture is triggered when the selected parameter reaches a limit or passes beyond the set range.

Another form of trigger relates to edge detection. Here, the tool may be set to detect passage through a threshold as well as the direction and possibly the rate of signal change. A fall through a threshold, for example, may be considered a trailing edge and used to trigger data capture. A rise through a threshold may be considered a leading edge and used to trigger data capture. In either case, the trigger occurs only when the selected parameter crosses the threshold in the specified direction, and thus, not when the selected parameter crosses the same threshold in the opposite direction. Of course, other edge detection techniques may be used, such as positive or negative-going spikes of significant magnitude in the differential of the selected parameter. Data capture may also trigger on other signal waveform characteristics, such as zero-crossings, maximum or minimums or valleys, impulses, etc.

More complex forms of triggers, based on combinations of events or conditions, also may be supported by the programming of the tool. This allows the user to set detection events for multiple PID data streams and have the tool trigger its capture of data when a selected combination of those events occur. The tool may trigger when the combination of events occur at one time, when events occur in some time interval, when events occur in a user-selected sequence, etc.

For example, a trigger may be defined as a concurrent detection of events, combined with specified Boolean logic. An 'AND' logic, for example, might require that two or more PID parameters exceed respective upper thresholds at the same time. Another concurrent Boolean logic trigger might utilize a combination of AND and OR logic, for example, to require that PID1 OR PID2 exceed a respective upper threshold AND (at the same time) that PID3 exceed a respective upper threshold. In a specific engine analyzer example, the analyzer might capture a sequence of monitored parameter data around the time of detection that the engine revolutions per minute is above 6000 RPM OR oil pressure is below 20 PSI in simultaneous combination with (AND) engine temperature above 200 degrees F. Of course, the full range of Boolean logic operations may be used in any combination(s) deemed appropriate by the user.

Alternatively, combinational triggers may be defined by Boolean logic but where the events occur within some interval or in some specified consecutive order. In a two-event consecutive trigger example, occurrence of the first event "enables" detection of the second event, so that data capture is actually triggered only when the second event is detected after the first. In a specific engine analyzer example, upon detection of RPM of 600 or above, the analyzer might enable triggering when the oil pressure falls below 20 PSI AND the engine temperature rises above 200 degrees F.

Triggering may also incorporate various timing elements. For example, the user may program the tool to detect when a PID value exceeds a threshold for some user-selected time. In the engine analyzer case, one such example might be to trigger when RPM exceeds 6000 for more at least 10 seconds, OR the oil pressure stays at or below 20 PSI for at least 5 seconds, OR the temperature stays at or above 200 degrees F. for 15 seconds. In the example, the time elements were continuous periods, but those skilled in the art will recognize that the tool may allow the user to set time periods with respect to cumulative non-continuous amounts of time, e.g. so as to trigger when the total time that RPM exceeds 6000 RPM reaches 10 minutes.

In the examples above, the triggering utilizes the actual measured value for each respective PID parameter. However, it is also possible to utilize a computational value derived from any one or more of the measured parameters, such as a derivative (first, second, third, etc.), a multiple (by a constant or variable), a power (raised to the second, third, etc.), or an integral. The slope or first derivative, for example, relates to the rate of change of a measurement signal, and a user might want to set a trigger to detect change in engine RPM of at least 2000 RPM/sec, or to detect a sum (or integral) of temperature of at least 100 BTU. More complex algorithms combining multiple measured parameters values may also be used.

Yet another type of triggering involves counting of one or more types of specified events. With this approach, the user might specify a PID, a threshold and a number of times that the measured data for that PID can exceed the threshold. The tool would then count the number of times that data exceeds the threshold, and the tool would trigger data capture when the count reaches the user-specified number, for example, when the RPM exceeds 6000 for the seventh time during a test. The counting may be limited based on time, for example, seventh event within 5 minutes, or the counting can relate to the entire test duration. Of course a count based trigger may use the actual value or a calculated value and may be combined with other user-specified conditions to define a particular complex trigger.

As noted, the triggering, data capture and display functions may be utilized in a variety of other types of diagnostic tools that constantly measure a parameter or monitor at least one measured parameter during a test run. Such tools may be used for applications other than vehicle diagnostics, but it may be helpful here to consider at least one other example in the vehicle diagnostics context.

The MODIS system is a modular, PC based platform for a wide range of vehicle diagnostic applications. The core of the system is essentially a handheld PC with graphics display capabilities and plug-in modules for specific diagnostic functions. For example, the MODIS system, incorporates the Snap-on Scanner scan tool as a plug-in module. The MODIS system also features Snap-on's powerful 4-channel lab scope with ignition capabilities and a powerful Digital Volt-Ohm Meter (DVOM) built into a common architecture with expandable ports.

Figure 15:
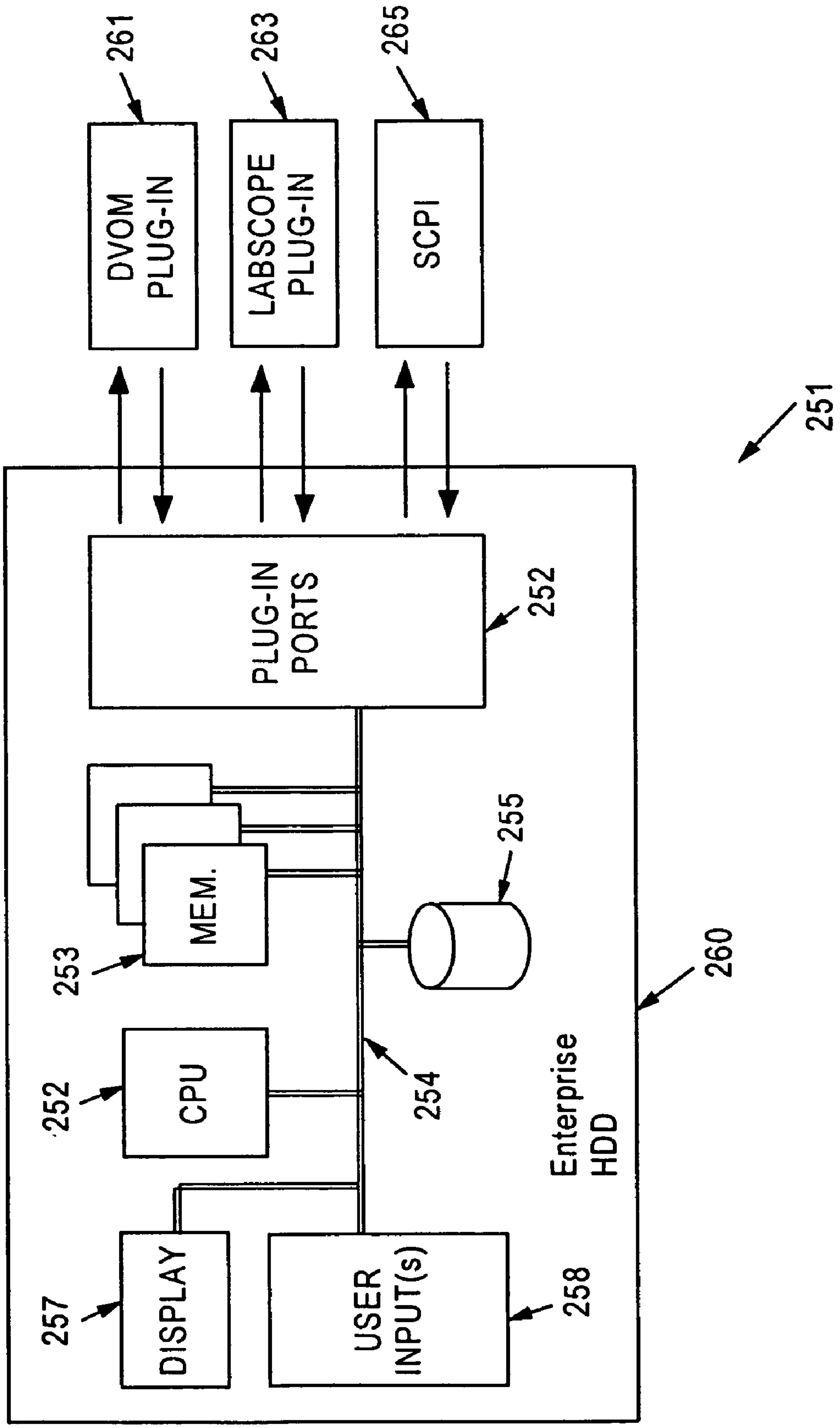
FIG. 15 is a functional block diagram of a MODIS modular diagnostic system, which is a PC based example of a diagnostic tool that can be programmed to implement the triggering and data storage functions.

FIG. 15 is a functional block diagram of the MODIS system, depicting a PC based implementation of a diagnostic system 251. As shown, many of the system elements are those associated with a general-purpose computer. The exemplary system 251 contains a central processing unit (CPU) 252, memories 253 and an interconnect bus 254. The CPU 252 may contain a single microprocessor (e.g. a Pentium-x or an x86 microprocessor), or it may contain a plurality of microprocessors for configuring the computer system 252 as a multi-processor system. The memories 253 include a main memory, such as a dynamic random access memory (DRAM), as well as a read only memory, such as a PROM, an EPROM, a FLASH-EPROM, or the like. In operation, the main memory stores at least portions of instructions and data for execution by the CPU 252. The system 251 may also include mass storage devices such as various disk drives, tape drives, etc., represented by way of example by the hard disk drive 255, for storing data and instructions for use by CPU 252.

The system 251 may also include one or more input/output interfaces for communications (not shown) for data communications via a network. If provided, such an interface may be a modem, an Ethernet card or any other appropriate data communications device, for digital communications of various types via the network. The physical communication links may be optical, wired, or wireless (e.g., via satellite or cellular network).

The system 251 also includes appropriate interconnection with a display 257 and one or more elements 258 for user input. In an example, the system 251 includes a graphics subsystem (not separately shown) to drive the output display 257. The output display 257 may include a cathode ray tube (CRT) display, although in applications for handheld diagnostic tools, the display 257 typically is a liquid crystal display (LCD).

In the example (FIGS. 17 and 18), the system 251 includes a series of keys, and the device may include touch sensitive input capability associated with the display for user input purposes. The input control device(s) 258 for such an implementation of the system 251 could include other types of user input devices, such as a keyboard for inputting alphanumeric and other key information, a cursor control device (not shown) and size, such as a mouse, a trackball, stylus, or cursor direction keys. However, for handheld applications, the number and size of separate input elements are kept to a minimum required to allow ergonomic operation of the particular tool.

The links of the input and output elements 257, 258 to the rest of the system 251 may be wired connections or use wireless communications, if the input output elements are remote. In portable or handheld implementations, the input and output elements are hardwired into the system and incorporated into the system (e.g. in the same housing—see FIGS. 17 and 18).

Like any computer system, the diagnostic tool type system 251 runs a variety of applications programs and stores data, enabling one or more interactions via the user interface, provided through elements such as 257 and 258, to implement the desired processing, in this case for the diagnostic tool functions. The system 251 may run a number of such programs for different diagnostic purposes, and some tools may run diverse programs useful for the technician, but not directly related to the diagnostic applications (e.g., e-mail).

Figure 16:
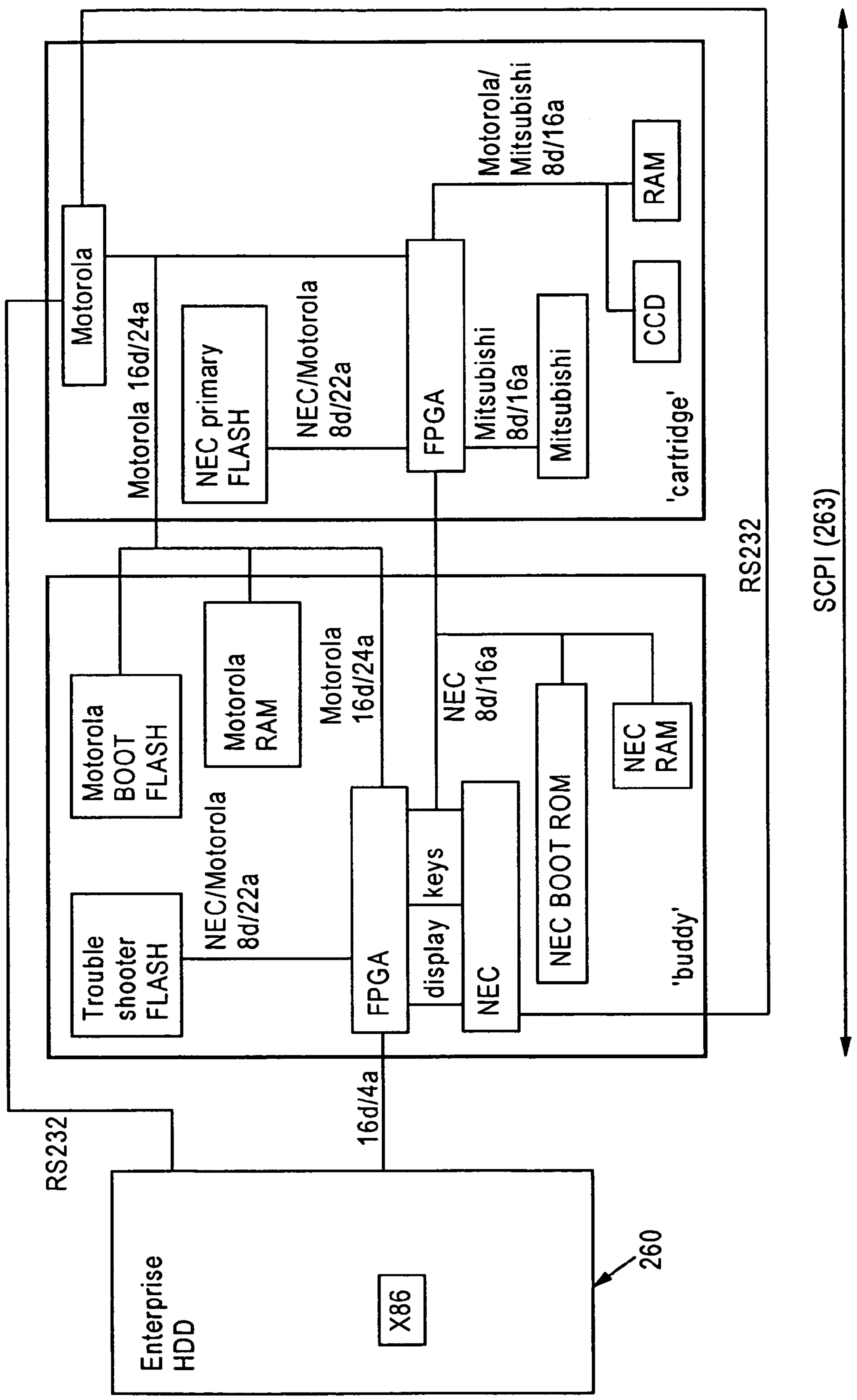
FIG. 16 is an alternative block diagram of the MODIS, showing the elements of the scanner cartridge plug-in (SCPI) module in somewhat more detail.

In the MODIS tool configuration of the system 251, the main portion of the system takes the form of a handheld display device, referred to here as the 'Enterprise HDD' 260 (see also FIG. 16). As shown, the HDD also includes one or more ports 252 (in FIG. 15) for specific-application type plug-in modules. In an example, the Enterprise HDD 260 includes ports for concurrent plug-in of two such modules, although the device is compatible with a larger number of different types of such modules. Typical examples of the plug-in modules include a digital volt-ohm meter (DVOM) plug-in module 261, a Labscope plug-in module 263 and a scanner cartridge plug-in module (SCPI) module 265. The trigger functions and associated data capture operations may work on parameter data supplied to the HDD 260 from any of these modules and/or any other diagnostic application type plug-in modules compatible with the HDD 260.

FIG. 16 is an alternative block diagram, showing the SCPI type plug-in module in somewhat more detail. In the configuration shown in that drawing, the tool includes the PC board implementing the Enterprise HDD 260 and the connected scanner cartridge plug-in module SCPI 263. In such a configuration, the system will have four microprocessors (an x86 in the Enterprise HDD 260, as well as an NEC microprocessor, a Mitsubishi microprocessor and a Motorola microprocessor in the SCPI 263). The NEC, Mitsubishi and Motorola microprocessors are distributed onto 2 separate boards within SCPI module hardware. The peripheral components for each of the microprocessors (FLASH, DRAM, etc.) are also distributed on the two boards, but they are not necessarily grouped with the processors. A pair of FPGAs (one per board) is used to coordinate all the connections between the processors and peripheral components, however not all processor connections pass through the FPGAs.

The SCPI plug-in essentially implements many of the functions of a vehicle diagnostic scanner tool, for scanning and processing sensor and code data provided by a vehicle's on-board diagnostic system. However, overall control of the system is performed by the programmed logic of the Enterprise HDD 260.

Figure 17:
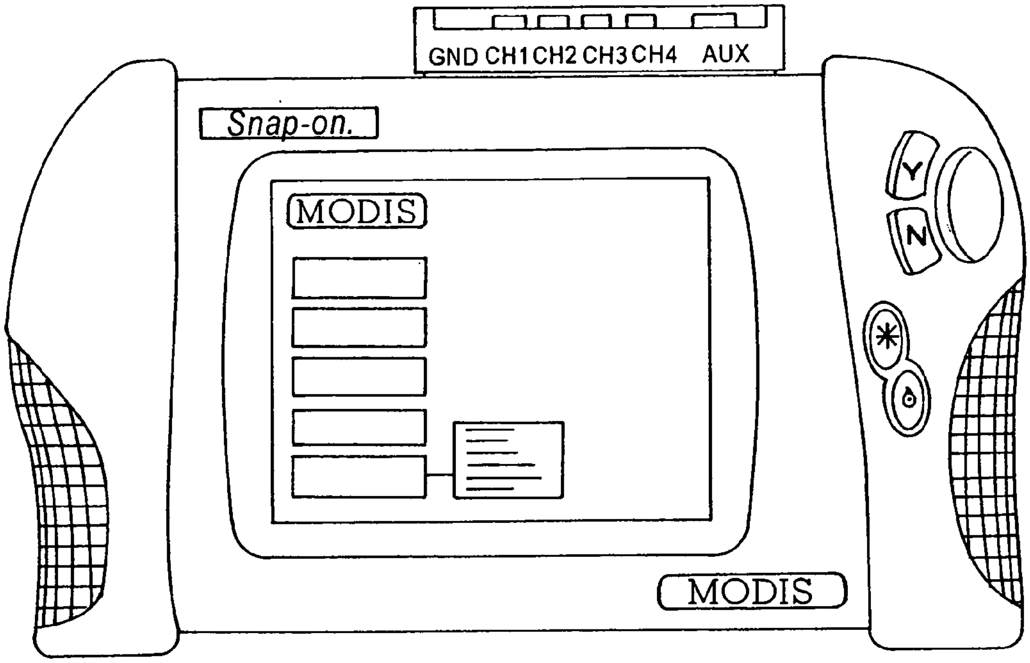
FIGS. 17 and 18 are photographs of the handheld MODIS system.
Figure 18:
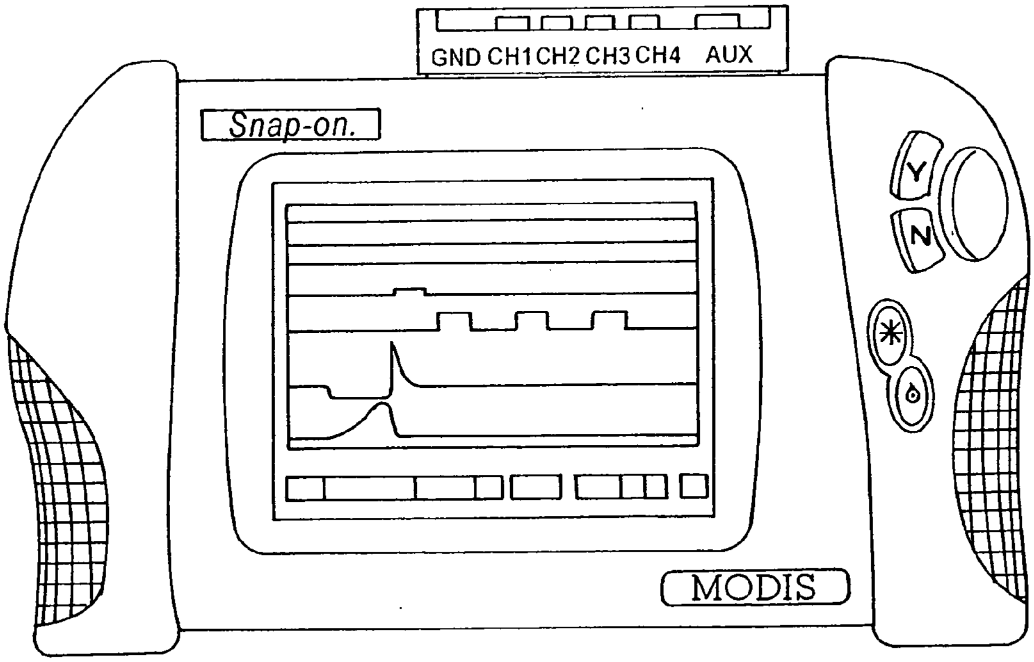

FIG. 17 is a picture of the MODIS tool, showing an initial menu. FIG. 18 is a picture of the MODIS tool showing operation with the Labscope plug-in.

For purposes of the present discussion, the programming of the diagnostic tool enables the tool to offer a series of user selectable trigger operations and attendant data capture functions. Triggering of data capture, such as a data movie, may be based on one or more user selected PID (parameter identifier) values, various conditions or combinations of conditions with regard to the selected PID value(s) and/or receipt of a user selected one of the trouble codes that might be received from the vehicle. The device provides menu displays giving the user the option to set up a recording event or events that can be triggered by a user selectable value from any one or more user selected PIDs. In a scanner configuration example, the parameter data corresponding to any selected PID may come from any module on the vehicle.

Another menu option allows the user to set up triggering based on a user selectable "Code", instead of just "any code" that the vehicle may send to the scanner. If using the Labscope or DVOM module (alone or in combination with the SCPI), a trigger may be set against any parameter provided by any connected module(s).

In the MODIS example of the tool, the trigger control references a parameter ID or "PID." The PID trigger feature is a software mechanism that provides the ability to "capture" all PID data values at the instance that the "trigger" condition occurs. In this specific example, the "trigger" condition is based on any value or derivative of the selectable and specific PID data value. With the implementation of this feature on the MODIS scanner plug-in, the PIDs will be able to trigger the freezing of graphs. Each PID will have options to trigger on rising edge and/or falling edge of the graph.

When the trigger option in the focused PID is selected, a blue cross-hairs will appear on the graph with numerical value of the horizontal line displayed at the left of the line and time offset of the vertical line displayed at the bottom of the line. The cross-hairs will be movable with directional keys to set the triggering value and trigger delay.

All PIDs will have the triggering options, and the triggers can be combined to have multiple triggering. If any one of the trigger trips, all of the graphs (including the ones that are not displayed) will be frozen. The graphs will restart when the "unfreeze" button on the menu bar is pressed and all PIDs will update until the next trigger condition occurs.

The graphs or the PID list of the scanner plug-in also will automatically freeze when the lab scope display is frozen or triggers. They are automatically restarted when the lab scope restarts graphing or unfreezes. This feature may be disabled by selecting the trigger link option within the tools menu.

The SET PID TRIGGER command activates the PID data capture routine, to cause the processor to check for a defined trigger condition as PID data is obtained. The trigger threshold value and trigger delay values are kept in association with each PID; and once a trigger condition is detected, the delay clock is decremented until the specified duration of measured parameters data is captured. The trigger value and delay are not specified in this command. These values are set when the directional buttons are used on crosshairs to set the trigger point. To select the trigger value, the horizontal trigger line is moved up/down by arrow buttons. The increment used here is in $1/255$th of the vertical graph scale.

When the trigger option is selected from the menu, crosshairs appear on the graph, as shown in FIG. 19. Actuation of the up or down arrow will move the horizontal crosshair line up or down $1/65536$th of the vertical scale. The corresponding numerical value is displayed on a small popup window drawn in the graph space at the left. If the up or down arrow is continuously pressed, the horizontal crosshair line will move up or down at $1/255$th of the vertical scale.

Actuation of the left or right arrow will move the vertical crosshair line left or right $1/512$th of the horizontal scale. Corresponding time delay is displayed on a small popup window drawn in the graph space at the bottom. If the left or right arrow key is continuously pressed, the vertical crosshair line will move left or right at $1/64$th of the horizontal scale. The HDD side will draw the cross hairs based on the response from the scanner plug-in, and it is the scanner plug-in that is drawing the cross hair location.

FIG. 20 depicts the sequence of steps involved in setting and clearing a trigger, in this example. In the first step S1, the user selects a trigger type from a pull down menu in PID display mode. Next (step S2), a trigger cursor appears, at vertical middle and 16 data points offset. A directional key designation is sent every time one of the directional keys is pressed, and in response, the crosshairs move to match the key press(es) as described above. At step S4, for each key pressed, the scanner plug-in sends up the current value for time delay or PID value, to the HDD. Once the trigger position is selected, the operator enters 'Y' to set it (step S5). In step S6, the scanner plug-in records the trigger position and it sends the offset value with each update data. Then, a minimized trigger crosshairs is drawn on the graph in black lines (S7).

FIG. 21 depicts the sequence of steps involved in triggering actual data capture. In the first step S11, the device detects that the PID data hits the trigger condition. In response, the scanner plug-in enters data update frozen state (at step S12). The full PID name list message is sent to the HDD (at step S13), and a trigger capture message is sent to the HDD (at step S14). In the next step (S15) the HDD switches to the frozen menu bar. If the device is in the PID list mode, the HDD updates the screen for display of the full list, with the latest measured data values (S16). A full trigger crosshair appears on the triggering PID using red lines (S17), to identify the PID data that hit the respective trigger and activated the data capture (freeze) operation.

FIG. 22 depicts the sequence of steps involved in canceling a trigger. In this operation, the first step (S21) entails a user selection of the trigger from a PID pull down menu. Full cross hairs for the trigger setting appear at step S22. The user may then enter a no or negative by activating the 'N' on the key pad (at step S23). The trigger setting command is sent with an indication of the 'cancel' option. In response (at step S24), the scanner plug-in clears the specified trigger capture condition.

In the processing outlined above, the PID TRIGGER CAPTURE message is sent by the scanner plug-in cartridge, whenever a PID trigger condition is met; and in response all the data updates are halted. With this message, the HDD side enters the "frozen" menu bar and the scanner cartridge plug-in side status is updated to frozen data status. This message may be issued even when a PID list is not being displayed. If the PID list is not being displayed, the index number indicates the offset within the entire PID list. If the PID list is being displayed the PID name list is issued first, and then the trigger capture message is sent. In any case, the number of PIDs displayed defaults back to the full PID list.

In the scanner configuration (FIG. 16), the monitored parameter data is supplied to the tool from the vehicle's on-board diagnostic system. Those skilled in the art will recognize that the tool itself may perform the measurements, for example, when configured with the DVOM plug-in or with the Labscope module.

As in the example of FIGS. 1–14, the tool offers user selectable options (parameter, selection trigger/threshold settings, Boolean logic, etc.) for activating data capture. The diagnostic tool also gives the user various options regarding how much data is saved before and after an event trigger occurs. The tool may take an instantaneous image (like a "photograph") of the measured data parameters, in response to activation of the "trigger" function. Alternatively, the tool may capture and buffer running parameter data for some period of time after and/or before the trigger occurs and allow the user to select the precise time range for capture and display as a movie or slide-show. In an example, an option on the trigger menu defines the position of the snap shot frames recorded relative to the trigger, i.e. trigger at beginning, middle or end of the buffer range. Once a snap shot has been recorded, it can be reviewed frame by frame, and up to 8 parameters plotted on the display screen in a graphing mode. Hence, the tool stores parameter data, for later review by the user. As a result, the user need not remain present throughout the test. The user can leave the test going and the tool running and look back later (e.g. after a test drive is complete) to observe the data captured upon detection of the trouble code.

In the examples, the different diagnostic tools implement a user definable trigger functionality, in which the user can select any one or more of the parameters and can set one or more conditions for the selected parameter(s) as a triggering event. The examples also allow the user to select several options for capturing and storing data at or around the time of the event with attendant options for later display of the captured parameter data. Such technologies are embodied in diagnostic tools and for methods of operation of such tools. The control logic could be implemented by circuit components. However, since the exemplary devices are programmed by software or code stored in firmware, other aspects of the technology may be embodied as programming.

As yet another example, the tool may provide a Performance Timer Mode (PTM) based on monitoring and triggering off of the speed of the vehicle. Although other measurement units could be used, for purposes of discussion here, we will assume that the tool monitors vehicle speed in miles per hour (MPH). In this example, the end user chooses the PTM mode, which starts the internal clock when the parameter starts to move from 0 MPH. The software allows the end user to choose to automatically stop the internal clock timer by selecting specific MPH, such as 60. The scan device may sound the beeper to indicate the test is complete. The tool captures data around the trigger event, in this case, the MPH threshold (e.g. when the vehicle speed hits 60 MPH or the like). Of course, the user can select the window for data capture in relation to the event, as in the earlier examples. If the MPH threshold is at the end of the capture window, for example, the captured data will include monitored parameter data up until the vehicle reaches the threshold. In most cases, this will include the data since the vehicle started from 0 MPH. The test information is stored for future play back. The tool also stores the internal clock data regarding the time from 0 to the set MPH, for easy viewing by the user. The presentation of the stored test information may be in a graphical format, digital format or both.

Program aspects of the technology may be thought of a "products," typically in the form of executable code and/or associated data that is carried on or by a type of machine readable medium. The executable code and/or associated data controls the operation of the diagnostic tool, computer or other programmable device for implementing the triggering and data storage as described herein.

Physical media include the memory of the computer type diagnostic tool processing systems 251 or memories of the MT2500 (103) or associated cartridges, such as various semiconductor memories, tape drives, disc drives and the like. All or portions of the software may at times be communicated through the Internet or various other telecommunication networks. Such communications, for example, may be to load the software from another computer (not shown) into the diagnostic tool or into another network element, such as a web server used for software distribution or distribution of vehicle related diagnostic information. Thus, another type of media that may bear the software elements includes optical, electrical and electromagnetic waves, such as used across physical interfaces between local devices, through wired and optical landline networks and over various air-links.

Terms regarding computer or machine "readable medium" (or media) as used herein therefore relate to any physical medium or transmission medium that participates in providing instructions to a processor for execution. Such a medium may take many forms, including but not limited to, non-volatile media, volatile media, and transmission media. Non-volatile media include, for example, optical or magnetic disks, such as any of the storage devices in the systems of FIGS. 15 to 22. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of machine or computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of media may be involved in carrying one or more sequences of one or more instructions to a processor for execution, in order to implement the diagnostic tool functions, as described here.

The examples described above have focused on diagnostic tools used for vehicles, typically automobiles, trucks, etc. It will be apparent that such examples may be used with different vehicles and/or to diagnose different types of vehicle system. For example, the tools disclosed herein may include or be utilized with any appropriate voltage source, such as a battery, an alternator and the like, providing any appropriate voltage, such as about 12 Volts, about 42 Volts and the like, either as the power source for the tool itself of for diagnosis of equipment generating or operating on such voltages. Furthermore, the engine analyzer examples described herein may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Those systems or engines may be incorporated into other systems, such as an automobile, a truck, a boat or ship, a motorcycle, a generator, an airplane and the like. Of course, the diagnostic tools and the relevant concepts disclosed herein may find wide application in other fields, where testing and monitoring of test results in desirable.

While the foregoing has described various examples, it is understood that various modifications may be made therein and that the technologies disclosed herein may be implemented in various forms, and that they may be applied in numerous applications, only some of which have been described herein.

What is claimed is:

1. A method of capturing measurement data for a plurality of physical parameters measured during a test, comprising:

receiving a selection of a parameter from among the plurality of physical parameters, from a user;

receiving a selection of a trigger condition with respect to measurement of the selected parameter, from the user;

in real time during the test, receiving measurement data regarding the plurality of physical parameters;

analyzing a relationship of the measurement data for the selected parameter to the trigger condition; and in response to the analyzing indicating that the trigger condition has occurred in relation to the measurement data for the selected parameter, triggering capture of measurement data for the plurality of physical parameters for review by the user.

2. The method of claim 1, wherein:

the processing of the measurement data regarding each of the plurality of physical parameters includes receiving diagnostic signals that may include a plurality of codes, from an on-board diagnostic system of a vehicle;

the steps of receiving the selection of the parameter and receiving the selection of the condition comprise receiving a selection of a trouble code regarding a particular vehicle condition from among codes that may be received; and the analyzing of the relationship of the measurement data for the selected parameter to the trigger condition comprises detecting receipt of the selected trouble code.

3. The method of claim 1, wherein the processing of the measurement data regarding each of the plurality of physical parameters includes measuring the plurality of physical parameters to develop measurement data with respect to each of the measured physical parameters.

4. The method of claim 3, wherein the analyzing of the relationship of the measurement data for the selected parameter to the trigger condition comprises detecting occurrence of a predetermined event in the measurement data developed for the selected parameter.

5. A method of capturing measurement data for a plurality of physical parameters measured during a test, comprising:

receiving a selection of a parameter from among the plurality of physical parameters, from a user;

receiving a selection of a condition with respect to measurement of the selected parameter, from the user;

during the test, processing measurement data regarding each of the plurality of physical parameters, and analyzing a relationship of the measurement data for the selected parameter to the selected condition; and when the analysis determines that the selected condition has occurred in relation to the measurement data for the selected parameter, triggering capture of measurement data for the plurality of physical parameters for review by the user, wherein:

the processing of the measurement data regarding each of the plurality of physical parameters includes measuring the plurality of physical parameters to develop measurement data with respect to each of the measured physical parameters, the analyzing of the relationship of the measurement data for the selected parameter to the selected condition comprises detecting occurrence of a predetermined event in the measurement data developed for the selected parameter, and the predetermined event comprises an event chosen from a group of events consisting of: rising to a threshold value in the measurement data developed for the selected parameter, falling to a threshold value in the measurement data developed for the selected parameter, a leading edge in a signal pattern of the measurement data developed for the selected parameter, a trailing edge in a signal pattern of the measurement data developed for the selected parameter, a predetermined differential in the measurement data developed for the selected parameter, and a predetermined integral of the measurement data developed for the selected parameter.

6. The method of claim 3, wherein the analyzing of the relationship of the measurement data for the selected parameter to the trigger condition comprises detecting a selected number occurrences of a predetermined event in the measurement data developed for the selected parameter.

7. The method of claim 1, further comprising:

receiving a selection of another parameter from among the plurality of physical parameters, from a user;

receiving a selection of another trigger condition, with respect to measurement of the other selected parameter, from the user; and analyzing a relationship of the measurement data for the other selected parameter to the other trigger condition;

wherein the triggering of capture of measurement data is dependent on a selected logical relationship of detection of the trigger condition and detection of the other trigger condition.

8. The method of claim 7, wherein the selected relationship of the trigger conditions is a concurrent Boolean logic relationship.

9. The method of claim 7, wherein the selected relationship of the conditions comprises occurrence of the trigger conditions in a predetermined consecutive order.

10. The method of claim 1, wherein the step of analyzing comprises detecting that the measurement data for the selected parameter meets the trigger condition for a predetermined period of time.

11. The method of claim 1, wherein the plurality of physical parameters are operational parameters of a vehicle.

12. The method of claim 11, wherein the operational parameters of the vehicle include at least one engine performance parameter.

13. The method of claim 1, wherein:

the processing of the measurement data comprises buffering measurement data regarding each of the plurality of physical parameters for a predetermined interval during the test; and the triggered capture of measurement data comprises storing buffered data for the plurality of physical parameters for review by the user.

14. The method of claim 13, wherein the buffered data stored by triggering upon determination of occurrence of the trigger condition stores data obtained during an interval with a predetermined relationship to the time of the occurrence of the trigger condition.

15. The method of claim 1, wherein the triggered capture of measurement data comprises storing measurement data regarding each of the plurality of physical parameters for a point in time substantially corresponding to the occurrence of the trigger condition.

16. The method of claim 1, wherein the selected parameter relates to speed, the trigger condition is a predetermined speed, and the method further comprises capturing time from start until a monitored vehicle reaches the predetermined speed.

17. A diagnostic tool, comprising:

means for obtaining measurement data in real time regarding a plurality of physical parameters to be tested;

a central processing unit for receiving and processing the measurement data; and a user interface coupled to the central processing unit, for supplying user inputs of a selection of a parameter from among the physical parameters to be tested and a specification of a trigger condition relating to the selected parameter to the central processing unit, and for providing an output of information from the central processing unit to the user; and a memory, wherein:

the central processing unit is adapted for causing the memory to store a portion of the measurement data regarding each of the physical parameters in response to detection of occurrence of the trigger condition in relation to the selected parameter during execution of a test, and the central processing unit is adapted for causing output of the stored portion of the measurement data via the user interface.

18. The diagnostic tool of claim 17, wherein the means is adapted for obtaining the measurement data regarding each of the physical parameters during testing of a vehicle.

19. The diagnostic tool of claim 18, wherein the means is adapted for obtaining measurement data regarding a plurality of engine analysis parameters during operation of an engine of the vehicle.

20. The diagnostic tool of claim 17, wherein the user interface comprises:

at least one user input device, for actuation of by the user, to input the selection of a parameter and the specification of a condition; and a display for visual output of the stored measurement data to the user.

21. The diagnostic tool of claim 17, wherein the display comprises a graphical display for displaying graphs of measured data for a plurality of the parameters.

22. The diagnostic tool of claim 17, wherein the memory buffers real-time measurement data regarding the physical parameters during the test, and the central processing unit causes the memory to store the buffered data at a time related to the detection of occurrence of the trigger condition, as the portion of the measurement data.

23. The diagnostic tool of claim 22, wherein the user interface enables real-time replay from the memory of the buffered data from the time related to the detection of occurrence of the trigger condition.

24. The diagnostic tool of claim 17, wherein the means for obtaining measurement data comprises an interface for receiving the measurement data regarding the plurality of physical parameters from an on-board diagnostic system of a vehicle.

25. The diagnostic tool of claim 17, wherein the means for obtaining measurement data comprises a meter for measuring the plurality of physical parameters.

26. A product comprising programming embodied in or carried on a machine readable medium, wherein the programming is adapted for causing a processor running the programming to perform a sequence of operations for capturing measurement data for a plurality of physical parameters measured during a test, the operations comprising:

receiving a selection of a parameter from among the plurality of physical parameters, from a user;

receiving a selection of a trigger condition with respect to measurement of the selected parameter, from the user;

in real time during the test, receiving measurement data regarding the plurality of physical parameters;

analyzing a relationship of the measurement data for the selected parameter to the trigger condition; and in response to the analyzing indicating that the trigger condition has occurred in relation to the measurement data for the selected parameter, triggering capture of measurement data for the plurality of physical parameters for review by the user.

27. The product of claim 26, wherein the operations performed further comprise replaying the captured data to a user after completion of the test.

* * * * *